April 26, 1960 W. DARLING 2,934,640

REDUCTION OF REFLECTION IN A TRANSMITTING SYSTEM

Filed Dec. 31, 1956

INVENTOR.
WOODROW DARLING
BY
Charles H. Brown
ATTORNEY

United States Patent Office 2,934,640
Patented Apr. 26, 1960

2,934,640

REDUCTION OF REFLECTION IN A TRANSMITTING SYSTEM

Woodrow Darling, Merchantville, N.J., assignor to Radio Corporation of America, a corporation of Delaware Application December 31, 1956, Serial No. 631,641

15 Claims. (Cl. 250—17)

This invention relates to a method of and apparatus for reducing the effect of signal reflection in high-frequency transmitting systems.

In television and other high-frequency transmitting systems, a common problem is the reflection back from the transmitting antenna of a part of the wave energy due to an unbalance in impedance matching at the antenna. The reflected wave travels from the antenna to the transmitter and a part is again reflected back to the antenna, where a part of this multiple-reflected energy is radiated. The radiated reflected wave develops as an echo at the receiving stations. Other troublesome reflections may occur between the transmitter and the transmitting antenna.

An object of the invention is to cancel the waves reflected back to a transmitter from an antenna connected thereto.

Another object of the invention is to reduce or prevent reflected waves occurring in the output of a television transmitting system due to the mismatch of the impedances of connected circuit components from appearing as ghosts or echoes on the screen of a television receiver.

Briefly stated, the invention reduces the effect of wave reflection in high-frequency transmitting systems. This is done by picking up the wave reflected from the antenna, rectifying the picked-up wave, and utilizing the rectified wave to modulate the transmitter in a phase opposite to that of the reflected signal appearing at the output of the transmitter in order to cancel the effect of the reflected wave.

In one embodiment of the invention, the output of a transmitter is fed through a delay transmission line to an antenna. That portion of the output wave from the transmitter which is reflected back from the antenna along the transmission line to the transmitter is picked up by a directional coupler and fed through another delay transmission line to a detector where the reflected wave is rectified. The resultant rectified wave is then fed into a modulator which modulates the transmitter. The two delay lines are adjusted so that the modulated signal of the transmitter will contain a component equal in magnitude and opposite in phase to the reflected wave appearing at the output of the transmitter, resulting in the cancellation or reduction of the reflected wave.

In another embodiment of the invention the output of a transmitter is fed through a delay transmission line to an antenna. First and second directional couplers of the coaxial line section type are coupled to the delay transmission line at spaced points thereon. The second directional coupler is placed a quarter wavelength from the first directional coupler. The inner conductor of the first directional coupler is connected to the inner conductor of the second directional coupler. This arrangement is designed to automatically augment the isolation provided by the directional couplers. If the directional coupler is not terminated in its characteristic impedance or has finite coupling to the transmission line, it will pick up the forward wave of the transmitter going toward the antenna as well as the wave reflected back from the antenna. The forward wave of the transmitter will travel a distance of a quarter wavelength from the first directional coupler to the second directional coupler in the transmission line leading from the transmitter to the antenna. The inner conductor of the second directional coupler picks up a portion of the forward wave and returns it over a distance of a quarter wavelength to the inner conductor of the first directional coupler. Thus it may be seen that the portion of the forward wave returning from the second directional coupler to the first directional coupler has traveled a total distance of a half wavelength. The portion of the forward wave returning from the second directional coupler is therefore opposite in phase to the portion of the forward wave picked up by the first directional coupler and the two portions of the forward wave will cancel. The wave reflected back from the antenna to the transmitter is picked up by the inner conductor of the first directional coupler and the inner conductor of the second directional coupler. The portion of the reflected wave picked up by the second directional coupler travels a distance of a quarter wavelength before it is added in phase to the portion of the reflected wave picked up by the inner conductor of the first directional coupler. Thus, the reflection reduction portion of the transmitting system is isolated from the harmful effects of forward wave pickup. The portion of the reflected wave picked up by the first and second directional couplers is fed through another delay transmission line to a detector where the reflected wave is rectified. The resultant rectified wave is then fed to a modulator and used to modulate the transmitter to provide a component of the transmitted wave which will be opposite in phase to the reflected wave at the output of the transmitter. The correct phase relation is obtained by adjusting the electrical lengths of the two delay transmission lines.

A more detailed description of the invention follows in conjunction with a drawing, wherein.

Figure 1:
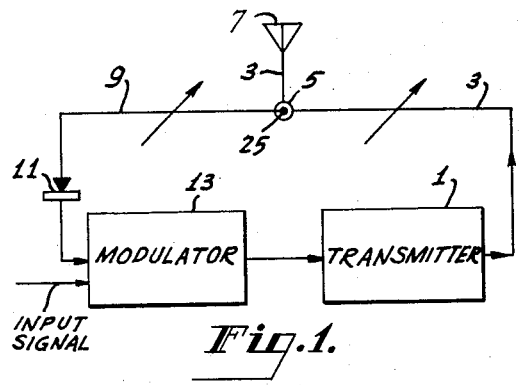
Fig. 1 is a diagrammatical presentation of a preferred embodiment of the invention illustrating the interconnection of the various parts of the reflection reducing system.

Referring to Fig. 1 in detail, there is shown a transmitter 1 feeding a transmitted signal through a variable delay transmission line 3 to an antenna 7. A wave reflected back toward the transmitter 1 from the antenna 7 through the variable delay transmission line 3 is picked up by a directional coupler 5 placed in the variable delay transmission line 3 and fed through another delay transmission line 9 to a detector 11. The detector 11 rectifies the reflected wave supplied thereto, and the resultant rectified wave is fed to a modulator 13 which modulates the transmitter 1. The modulated signal of the transmitter 1 thus contains a component representative of the reflected wave. The phase of this component will be approximately in phase or out of phase with the normally reflected wave as it leaves the transmitter depending on the number of video phase reversals occurring in the feed back loop 9. After adjusting the feed back loop 9 to approximately correct phase condition, the adjustable variable delay line 3 is then set to compensate for any residual phase error. By proper adjustment of the variable delay transmission lines 3 and 9 a component of the signal from transmitter 1 is made to be equal and opposite in phase to that of the reflected wave at the output of the transmitter, thus resulting in the cancellation of the reflected wave. The adjustable section of the variable delay transmission lines 3 and 9 may be of the telescoping type or of the trombone type shown in Fig. 3.

Figure 2:
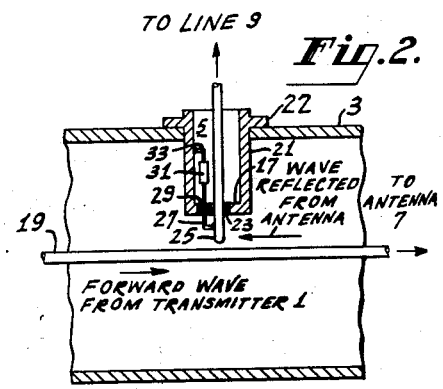
Fig. 2 is a cross sectional view of a type of directional coupler found to be effective for the purposes of the invention.

Fig. 2 is a cross sectional view of the directional coupler 5, illustrating the type of directional coupler found to be very effective for the purposes of the invention. As is shown, a directional coupler is a device that couples a secondary system to a wave traveling in a particular direction on a primary line, and greatly attenuates the wave traveling in the opposite direction. The directional coupler 5 used in the invention is placed in the variable delay coaxial transmission line 3 having an inner conductor 19. The directional coupler 5 comprises a cylindrical metal shell 21 and an inner conductor rod 25. The cylindrical metal shell 21 is closed at one end by a metallic plate 17. The closed end 17 of the shell 21 has a centrally located opening containing an insulator washer 23. The inner conductor rod 25 extends through the washer 23 to within the immediate vicinity of the inner conductor 19 of the coaxial transmission line 3. The innermost end of conductor rod 25 capacitively couples to the inner conductor 19 of the coaxial transmission line 3. A pickup loop 27 is attached near the end of the inner conductor rod 25 and extends through the closed end 17 of the shell 21. The pickup loop 27 enters the shell 21 through an opening in plate 17 at a point adjacent to the cylinder wall and passes through an insulator washer 29 to connect with one end of a resistor 31. The other end of resistor 31 is connected by a lead 33 to the wall of the cylindrical shell 21. The shell 21 is provided with a shoulder 22 which supports the directional coupler 5 upon the coaxial transmission lines 3 and allows rotation of the directional coupler 5 to determine the minimum pickup point for the forward wave from the transmitter. In this manner the maximum rejection of the forward wave relative to the back wave is obtained.

Figure 3:
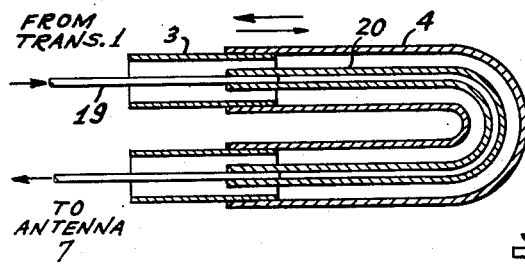
Fig. 3 is a cross sectional view of one type of telescoping adjustable delay transmission line found to be effective for the purposes of the invention.

Fig. 3 is a cross directional view of a trombone type of adjustable delay transmission line in which the adjustable portion consists of a slide arrangement which provides continuity between two fixed sections of coaxial transmission line. An outer conductor slide 4 is made from a section of tubing of sufficient diameter to slide over the outer conductor 3 of the coaxial transmission line. An inner conductor slide 20 is made from a section of tubing of sufficient diameter to slide over a portion of the length of the inner conductor 19 of the coaxial transmission line 3. Adjustment of the delay line is made by sliding the trombone section of line toward or away from the fixed sections of the transmission line leading to the transmitter 1 and the antenna 7.

In considering the adjustment of phase of the feedback loop 9, if the highest video frequency to consider is 4 mc. and assuming constant phase shift over the video band (i.e., time delay), it is probable in practice that the amount of the delay would be evaluated and the delay lines accordingly cut to length. For example, assume that the delay required at 4 mc. is 45°, since a full wavelength is equivalent to a phase change of 360°, only an eighth of a wavelength is required for the correct amount of delay. At a frequency of 4 mc. a full wavelength is equivalent to 246 feet and an eighth of a wavelength is equivalent to 30¾ feet.

Figure 4:
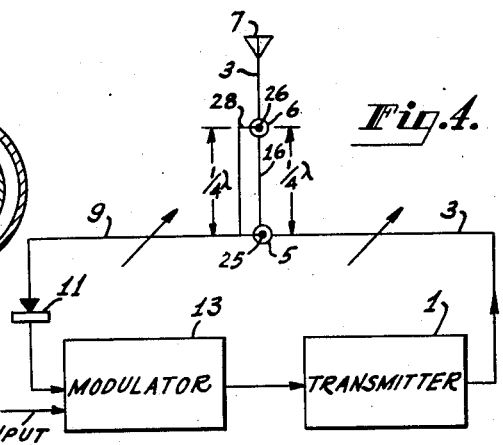
Fig. 4 is a diagrammatical presentation of another embodiment of the invention illustrating the use of two directional couplers in a wave reflection reduction arrangement to provide isolation of this part of the system from the forward wave of the transmitter.
Figure 5:
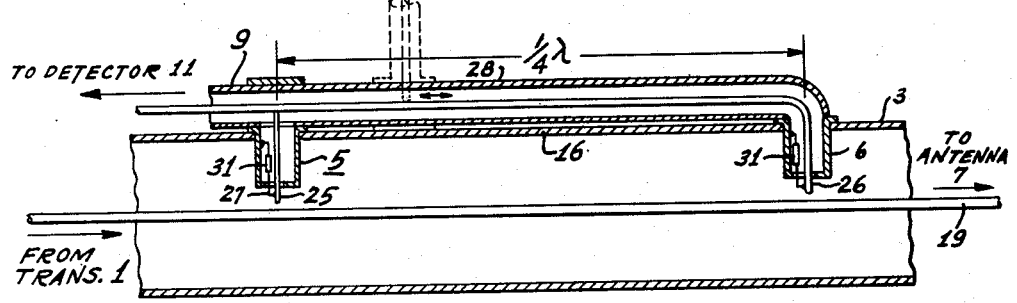
Fig. 5 is a cross sectional view of the section of coaxial transmission line leading from the transmitter to the antenna, in the system of Fig. 4, wherein the two directional couplers are connected by another coaxial transmission line of smaller diameter.

Fig. 4 is a diagrammatical presentation of another embodiment of the invention illustrating the use of two directional couplers in a reflection reduction arrangement to provide isolation in this portion of the system from the forward wave of the transmitter. The same reference characters are used in Figs. 1 and 4 to designate the same circuit elements. The transmitter 1 transmits a signal through the variable delay transmission line 3 to antenna 7. First and second directional couplers 5 and 6 are placed on the variable delay transmission line past the adjustable section of the line. The second directional coupler 6 is placed a quarter of a wavelength from the first directional coupler 5. The inner conductor 25 of the first directional coupler 5 is connected to the inner conductor 26 of the second directional coupler 6 by a coaxial section of line 28 as shown in Fig. 5. Section of line 28 is a quarter wavelength in length. It is difficult to perfectly match the terminating impedance of the directional coupler to the characteristic impedance of the line, thus, a small portion of the forward wave from the transmitter is picked up by the directional couplers 5 and 6. The portion of the forward wave picked up by the second directional coupler 6 travels a quarter of a wavelength in the transmission line 3 from the first directional coupler 5 and a quarter of a wavelength back along line 28 to directional coupler 5, thus making a total travel of two quarter wavelengths, or 180 degrees. Therefore, the portion of the forward wave picked up by the second directional coupler 6 and fed back to the first directional coupler 5 is opposite in phase to the portion of the forward wave picked up by the first directional coupler 5, as a result of which the two portions of the forward wave cancel each other at the junction of line 28 and the first directional coupler 5.

A portion of the wave reflected at the antenna 7 is picked up by the second directional coupler 6 and travels a distance of a quarter wavelength over lead 28 to the first directional coupler 5. The remaining portions of the reflected wave travel a distance of a quarter wavelength through section 16 of line 3 from coupler 6 to coupler 5. Hence, the two portions of the reflected wave picked up by both couplers are in phase and additively combine at the junction of line 28 and the first directional coupler 5.

In practice the actual distance between the pickup points of the directional couplers (i.e. the pickup loops), is somewhat more than a quarter wavelength through the interconnecting coaxial line 28. The exact minimum voltage position can be found if the contact feeding line 9 to the detector can slide along the inner conductor of line 28 through a slot in the outer conductor of line 28. This alternative arrangement is shown by the dotted line connections in Fig. 5. In this manner the rejection of the forward wave may be increased.

The combined portions of the reflected wave picked up by the directional couplers 5 and 6 are fed from the junction of line 28 and directional coupler 5 through the variable delay transmission line 9 to the detector 11. The reflected wave is rectified by the detector 11 and the resultant rectified wave is fed to the modulator 13 which modulates the transmitter 1. The modulated signal of the transmitter 1 thus contains a component representative of the reflected wave at the output of the transmitter. By adjusting the electrical lengths of the two delay transmission lines 3 and 9 by means of the adjustment shown in Fig. 3, the phase of the transmitted signal component is made opposite to that of the reflected wave at the output of the transmitter, thus resulting in the cancellation of the reflected wave.

In Fig. 5, there is shown a cross sectional view of the section of transmission line 3 leading from the transmitter to the antenna which contains the directional couplers 5 and 6. The couplers 5 and 6 are connected by the coaxial line 28 which is a quarter wavelength in length.

Line 28 is connected to transmission line 9 at the junction of directional coupler 5 and line 9.

The invention is particularly useful in reducing the effects of wave reflection in television transmitting systems so as to prevent the appearance of ghosts or echoes on the television receiver. The input signal fed into the modulator will in such case be a video or picture signal and the quarter wavelength sections 16 and 28 are electrically a quarter wavelength at the mean operating frequency. The quarter wavelength sections 16 and 28 are electrically a quarter wavelength long within the video channel, with a final adjustment in length to provide the greatest reduction in echoes. This point in frequency will probably be near the video carrier frequency as the greatest amount of energy is concentrated at that frequency.

What is claimed is:

1. A system for reducing the effect of reflection in the output of a high frequency transmitting system due to mismatch of the impedances of circuit components in the output of the transmitter comprising a transmitter, a modulator for said transmitter, an antenna connected through a first transmission line to said transmitter, a directional coupler connected to said first transmission line to receive the wave reflected back toward the transmitter from said antenna upon the operation of said transmitter to forward an output signal to said antenna over said first transmission line, a detector having a second transmission line in series therewith coupled to said directional coupler to provide rectification of said reflected waves, and means to connect said detector to said modulator to feed said resultant rectified waves from said detector to said modulator to cause said output signal of said transmitter to be modulated by said rectified waves.

2. A system for reducing the effect of reflection in the output of a high frequency transmitting system due to mismatch of the impedances of circuit components in the output of the transmitter comprising a transmitter, a modulator for said transmitter, an antenna connected through a first variable delay transmission line to said transmitter, a directional coupler connected to said first variable delay transmission line to receive a portion of the waves reflected back to said transmitter from said antenna upon the operation of said transmitter to forward an output signal to said antenna over said first transmission line, a detector having a second variable delay transmission line in series therewith coupled to said directional coupler to provide rectification of said reflected waves, means to connect said detector to said modulator to feed said resultant rectified waves from said detector to said modulator to cause said output signal of said transmitter to be modulated by said rectified waves, said first and second varaible delay transmission lines being adjusted to cause said output signal to be modulated by said rectified waves in a phase opposite to that of said reflected waves.

3. A system for reducing the effect of back wave reflection in the output of a high frequency transmitting system due to mismatch of the impedances of circuit components in the output of the transmitter comprising a transmitter, a modulator for said transmitter, an antenna connected through a first variable delay transmission line to said transmitter, first and second directional couplers spaced on said first variable delay transmission line to receive the waves reflected back to said transmitter from said antenna, said first directional coupler being connected to said second directional coupler, a detector having a second variable delay transmission line in series therewith coupled to said first directional coupler to provide rectification of said reflected wave, said detector being coupled to and feeding the resultant rectified wave to said modulator to provide modulation of the output signal of said transmitter by said rectified wave, said first and second varaible delay transmission lines being adjusted to provide modulation of said output signal by said rectified wave in a phase opposite to that of said reflected wave.

4. A system for reducing the effect of reflection in the output of a high frequency transmitting system due to mismatch of the impedances of circuit components in the output of the transmitter as claimed in claim 3, said second directional coupler being spaced a quarter wavelength from said first directional coupler to provide isolation of the reflection reducing portion of the system from the forward going output signal of said transmitter.

5. A system for reducing the effect of back wave reflection in the output of a high frequency transmitting system due to mismatch of the impedances of circuit components in the output of the transmitter comprising a transmitter, a modulator for said transmitter, an antenna connected through a first variable delay transmission line to said transmitter, first and second directional couplers spaced on said first variable delay transmission line to receive the waves reflected back to said transmitter from said antenna, a section of coaxial line coupling said first directional coupler to said second directional coupler, a detector having a second variable delay transmission line in series therewith adjustably coupled to a point on said coaxial line to provide rectification of said reflected wave, said detector being coupled to and feeding the resultant rectified wave to said modulator to provide modulation of the output signal of said transmitter by said rectified wave, said first and second variable delay transmission lines being adjusted to provide modulation of said output signal by said rectified wave in a phase opposite to that of said reflected wave.

6. A system for reducing the effect of reflection in the output of a television transmitting system due to mismatch of the impedances of circuit components in the output of the television transmitter comprising a television transmitter, a modulator for said transmitter, an antenna connected through a first transmission line to said transmitter, a directional coupler connected to said first transmission line to receive the waves reflected back to said transmitter from said antenna upon the operation of said transmitter to forward an output signal to said antenna over said first transmission line, a detector having a second transmission line in series therewith coupled to said directional coupler to provide rectification of said reflected waves, and means to connect said detector to said modulator to feed said resultant rectified waves from said detector to said modulator to cause said output signal of said transmitter to be modulated by said rectified waves.

7. A system for reducing the effect of reflection in the output of a television transmitting system due to mismatch of the impedances of circuit components in the output of the television transmitter comprising a television transmitter, a modulator for said transmitter, an antenna connected through a first variable delay transmission line to said transmitter, a directional coupler connected to said first variable delay transmission line to receive the waves reflected back to said transmitter from said antenna upon the operation of said transmitter to forward an output signal to said antenna over said first transmission line, a detector having a second variable delay transmission line in series therewith coupled to said directional coupler to provide rectification of said reflected waves, and means to connect said detector to said modulator to feed said resultant rectified waves from said detector to said modulator to cause said output signal of said transmitter to be modulated by said rectified waves, said first and second variable delay transmission lines being adjusted to provide modulation of said output signal by said rectified wave in a phase opposite to that of said reflected wave.

8. A system for reducing the effect of reflection in the output of a television transmitting system due to mismatch of the impedances of circuit components in the output of the television transmitter comprising a television transmitter, a modulator for said transmitter, an antenna connected through a first variable delay transmission line to said transmitter, first and second directional couplers spaced on said first variable delay transmission line to receive a portion of the waves reflected back to said transmitter from said antenna, said first directional coupler being connected to said second directional coupler, a detector having a second variable delay transmission line in series therewith coupled to said first directional coupler to provide rectification of said reflected wave, said detector being coupled to and feeding the resultant rectified wave to said modulator to provide modulation of the output signal of said transmitter by said rectified wave, said first and second variable delay transmission lines being adjusted to provide modulation of said output signal by said rectified wave in a phase opposite to that of said reflected wave.

9. A system for reducing the effect of reflection in the output of a television transmitting system due to mismatch of the impedances of circuit components in the output of the television transmitter comprising a television transmitter, a modulator for said transmitter, an antenna connected through a first variable delay transmission line to said transmitter, first and second directional couplers spaced on said first variable delay transmission line to receive the waves reflected back to said transmitter from said antenna, a section of coaxial line coupling said first directional coupler to said second directional coupler, a detector having a second variable delay transmission line in series therewith adjustably coupled to a point on said coaxial line to provide rectification of said reflected wave, said detector being coupled to and feeding the resultant rectified wave to said modulator to provide modulation of the output signal of said transmitter by said rectified wave, said first and second variable delay transmission lines being adjusted to provide modulation of said output signal by said rectified wave in a phase opposite to that of said reflected wave.

10. A system for reducing the effect of reflection in the output of a television transmitting system due to mismatch of the impedances of circuit components in the output of the television transmitter as claimed in claim 8, said second directional coupler being spaced a quarter wavelength from said first directional coupler to provide isolation of the reflection reducing portion of the system from the forward output signal of said transmitter going toward said antenna.

11. A system for reducing the effect of reflection in the output of a high frequency transmitting system due to mismatch of the impedances of circuit components in the output of the transmitter comprising a transmitter device, an antenna connected through a first transmission line to said transmitter, a directional coupler connected to said first transmission line to receive the waves reflected back toward the transmitter from said antenna upon the operation of said transmitter to forward an output signal to said antenna over said first transmission line, a detector having a second transmission line in series therewith coupled to said directional coupler to provide rectification of said reflected wave, and means for applying said rectified wave from said detector to said transmitter to cause said transmitter to produce a component of said output signal in a phase opposite to that of said reflected wave.

12. A system for reducing the effect of back wave reflection in the output of a high frequency transmitting system due to mismatch of the impedances of circuit components in the output of the transmitter comprising a transmitter, an antenna connected through a first transmission line to said transmitter, first and second directional couplers spaced on said first transmission line to receive the waves reflected back to said transmitter from said antenna upon the operation of said transmitter to forward an output signal to said antenna over said first transmission line, said couplers being spaced a distance apart to provide isolation of the reflection reducing portion of the system from the forward going output signal of said transmitter, means for connecting said first coupler to said second coupler, a detector having a second transmission line in series therewith coupled to said first coupler to provide rectification of said reflected wave, means to apply said rectified wave from said detector to said transmitter to cause said transmitter to produce a component in said output signal of a phase opposite to that of said reflected wave.

13. A system for reducing the effect of reflection in the output of a transmitting system comprising a transmitter, an antenna connected by a transmission path to said transmitter, means coupled to said transmission path arranged to receive only the waves reflected back from said antenna to said transmitter upon said transmitter being operated to forward an output signal to said antenna over said path, a detector connected to said means and arranged to rectify said received reflected waves, and means for applying said rectified waves from said detector to said transmitter to cause said output signal to be modulated by said rectified waves in a phase opposite to that of said reflected waves.

14. A system as claimed in claim 13 and wherein said transmitter is a television transmitter.

15. A system for reducing the effect of reflection in the output of a transmitting system comprising a transmitter, an antenna connected by a transmission line to said transmitter, means coupled solely to said line for receiving a sample of the wave energy reflected back from said antenna to said transmitter upon said transmitter being operated to forward an output signal to said antenna over said line, and means for applying said received sample of wave energy from said first-mentioned means to said transmitter as a modulating signal to produce a component in said output signal equal in magnitude and opposite in phase to said reflected wave energy.

References Cited in the file of this patent

UNITED STATES PATENTS

| | | |
|---|---|---|
| 1,986,623 | Conklin et al. | Jan. 1, 1935 |
| 2,070,666 | Llewellyn | Feb. 17, 1937 |
| 2,530,418 | Alvarez | Nov. 21, 1950 |
| 2,546,025 | Breimer | Mar. 20, 1951 |

FOREIGN PATENTS

| | | |
|---|---|---|
| 421,013 | Great Britain | Dec. 12, 1934 |